United States Patent [19]  [11] 3,714,260
Coon et al. [45] Jan. 30, 1973

[54] 4,4-BIS (DIFLUORAMINO)-1,7-DIFLUORO-1,1,7,7-TETRANITROHEPTANE

[75] Inventors: Clifford L. Coon, Fremont; Marion E. Hill, Palo Alto; Donald L. Ross, Menlo Park, all of Calif.

[73] Assignee: The United States of America as represented by the Secretary of the Navy

[22] Filed: Oct. 13, 1969

[21] Appl. No.: 866,438

[52] U.S. Cl. ..............................260/583 NH, 149/88
[51] Int. Cl...............................................C07c 87/22
[58] Field of Search ..............................260/583 NH

[56] References Cited

UNITED STATES PATENTS 3,470,170   9/1969   Dinwoodie et al. ..................260/244

Primary Examiner—Leland A. Sebastian
Attorney—Richard S. Sciascia, Q. Baxter Warner and Gayward N. Mann

[57] ABSTRACT

4,4-bis (difluoramino)-1,7-difluoro-1,1,7,7-tetranitroheptane, a plasticizer for double-base propellant systems, is synthesized by reacting 1,7-difluoro-1,1,7,7-tetranitro-4-heptanone with a mixture of fuming $H_2SO_4$, $CH_2Cl_2$ and $HNF_2$.

3 Claims, No Drawings

4,4-BIS (DIFLUORAMINO)-1,7-DIFLUORO-1,1,7,7-TETRANITROHEPTANE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates in general to novel chemical compositions and in particular to complex fluoronitro compounds useful as plasticizers for double-base propellants and to a method of making the same.

2. Description of the Prior Art

Many prior additives have been incorporated into double-base propellant systems in order to upgrade the propellants by increasing the specific impulse, burning rate, etc. But most added ingredients are unsatisfactory in that they do not meet all requirements necessary for their use in the system. The present plasticizer composition, however, may be incorporated into all propellant systems for upgrading purposes without any deleterious side effects. It will meet and satisfy all plasticizer requirements for use in any double-base propellant.

SUMMARY OF THE INVENTION

This invention concerns a novel plasticizer composition for incorporation into a double-base propellant system or other explosive compositions. It will upgrade such systems by increasing the specific impulse and burning rate of the propellants. Specifically the novel plasticizer is 4,4-bis (difluoramino)-1,7-difluoro-1,1,7,7-tetranitroheptane and is synthesized by reacting 1,7-difluoro-1,1,7,7-tetranitro-4-heptanone with a mixture of the following ingredients: fuming $H_2SO_4$, $CH_2Cl_2$ and $HNF_2$.

OBJECTS OF THE INVENTION

It is an object of the present invention to provide an improved plasticizer composition for use in double-base propellant systems.

It is another object of the present invention to provide an improved double-base propellant plasticizer which is easily synthesized by a simple and direct reaction series.

It is a further object to provide an improved plasticizer composition which will plasticize nitrocellulose, is compatible with double-base ingredients, is heat stable, has a high density, has a low vapor pressure, has a high heat of formation and will increase specific impulse of a propellant.

It is a still further object to provide an improved plasticizer composition for double-base propellant systems which is economical to synthesize and reliable in operation.

Other objects, advantages, and novel features of the invention will become apparent from the following detailed description.

DESCRIPTION OF THE PREFERRED EMBODIMENT

This invention comprises a new plasticizer for double-base propellant systems comprising 4,4-bis (difluoramino)-1,7-difluoro-1,1,7,7-tetranitroheptane formed by the following chemical synthesis:

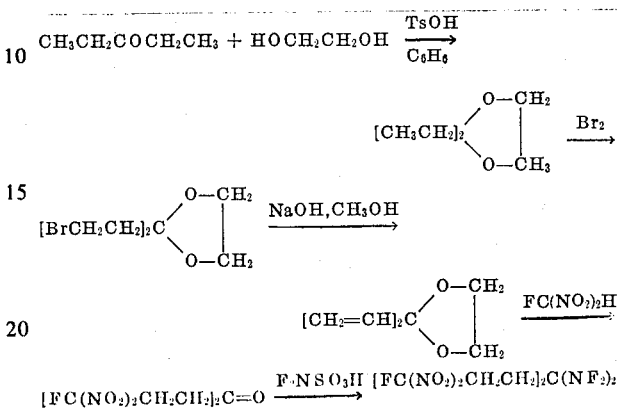

The following example serves to illustrate the present invention. It will be noted that the preparation of the present compound starts with 1,7-difluoro-1,1,7,7-tetranitro-4-heptanone and for the synthesis thereof refer to M. Graff and W. H. Gilligan, Journal Organic Chemistry, 33, 1247 (1968).

EXAMPLE

To a mixture of 29 ml. of 30 percent fuming $H_2SO_4$ and 25 ml. of $CH_2Cl_2$ at 5°C was condensed 9.66 g (0.18 mole) of $HNF_2$. To this mixture was added a solution of 14.8 g (0.045 mole) of 1,7-difluoro-1,1,7,7-tetranitro-4-heptanone in 80 ml. of $CH_2Cl_2$. The reaction mixture was stirred at 0°–5°C for 15 minutes and the organic phase and the acid phase were poured into separate beakers of crushed ice. The organic phase was separated, washed thoroughly with water, and dried over magnesium sulfate. The $CH_2Cl_2$ was evaporated leaving 14.2 g. (76 percent yield) of pale yellow solid 4,4-bis (difluoramino)-1,7-difluoro-1,1,7,7-tetranitroheptane.

This novel heptane has a primary purpose as a plasticizer for double-base propellant systems. It is a solid compound with a melting point of 53.5° to 55.5°C and is insensitive to a hammer blow. It will plasticize nitrocellulose, is compatible with double-base ingredients, is heat stable, has a high density, has low vapor pressure, has high heat of formation, will increase specific impulse and burning rate of the propellant and is easily synthesized. In addition this compound is also useful as an ingredient in explosive compositions.

We claim:

1. The composition 4,4-bis (difluoramino)-1,7-difluoro-1,1,7,7-tetranitroheptane having the formula:

$$[FC(NO_2)_2CH_2CH_2]_2C(NF_2)_2$$

2. The process of synthesizing 4,4-bis (difluoramino)-1,7-difluoro-1,1,7,7-tetranitroheptane comprising reacting 1,7-difluoro-1,1,7,7-tetranitro-4-heptanone with a mixture of fuming $H_2SO_4$, $CH_2Cl_2$ and $HNF_2$, said process being carried out at a temperature between about 0°–5°C.

3. The process of claim 2 wherein:
14.8 grams of a solution of said 1,7-difluoro-1,1,7,7-tetranitro-4-heptanone was added to said mixture comprising 29 milliliters of 30 percent fuming $H_2SO_4$, 25 milliliters of $CH_2Cl_2$ and 9.6 grams of $HNF_2$.

* * * * *

UNITED STATES PATENT OFFICE
CERTIFICATE OF CORRECTION

Patent No. 3,714,260           Dated   30 January 1973

Inventor(s)  Clifford L. Coon et al

It is certified that error appears in the above-identified patent and that said Letters Patent are hereby corrected as shown below:

Column 2, line 62, that portion of formula reading "$CH_2CH_{22}$" should read -- $CH_2CH_2]_2$ --

Signed and sealed this 10th day of July 1973.

(SEAL)
Attest:

EDWARD M. FLETCHER, JR.　　　　　　Rene Tegtmeyer
Attesting Officer　　　　　　　　　Acting Commissioner of Patents